United States Patent [19]

Miller

[11] 4,067,178
[45] Jan. 10, 1978

[54] COMBINED HEDGER-TOPPER
[75] Inventor: Charles Dale Miller, Winter Park, Fla.
[73] Assignee: A. Duda and Sons, Oviedo, Fla.
[21] Appl. No.: 684,111
[22] Filed: May 7, 1976
[51] Int. Cl.² .......................................... A01D 55/18
[52] U.S. Cl. ...................................................... 56/235
[58] Field of Search .......... 56/235, 233, 234, 236–238, 56/15.3, 11.9

[56] References Cited
U.S. PATENT DOCUMENTS

| 3,487,615 | 1/1970 | Leydig et al. | 56/235 |
| 3,597,908 | 8/1971 | Schaefer | 56/233 |
| 3,613,336 | 10/1971 | Smith | 56/11.9 X |
| 3,777,459 | 12/1973 | Elliott | 56/15.3 |
| 3,952,485 | 4/1976 | McRobert | 56/235 |

FOREIGN PATENT DOCUMENTS

| 790,254 | 2/1958 | United Kingdom | 56/235 |

Primary Examiner—Jay N. Eskovitz
Attorney, Agent, or Firm—Julian C. Renfro

[57] ABSTRACT

Apparatus serving the combined functions of maintaining a grove or orchard in properly trimmed as well as topped condition, comprising a vehicle adapted for movement along the ground in a direction essentially parallel to and adjacent a row of trees. A generally U-shaped structural member is operably mounted upon the vehicle, with this member having a pair of arms, one disposed on each side of the vehicle, and with the base portion interconnecting these arms being disposed at a forward location on the vehicle. The end of each arm remote from the base portion is rotatably mounted to an attachment point located on the frame of the vehicle, and devices such as actuators are utilized for bringing about selected movements of these arms about their attachment points, thus to change the effective height of the base portion with respect to the ground. The base portion serves as the mounting for a pair of booms, upon each of which, a multiplicity of saw blades are mounted. These saw blades are comparatively closely spaced, and upon being driven in rotation, can carry on an effective hedging operation when the saw booms are generally vertically disposed, and a topping operation when the booms are essentially horizontally disposed in an elevated position. Advantageously, the base portion can, in accordance with this invention, be rotated with respect to the arms between a position appropriate for the saw booms to bring about a hedging operation, and a position appropriate for the saw booms to conduct a topping operation.

14 Claims, 14 Drawing Figures

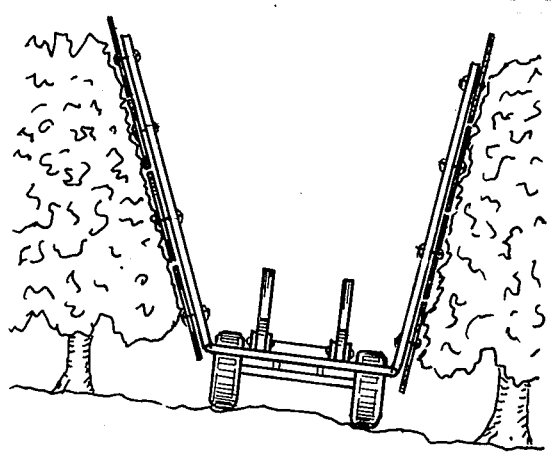 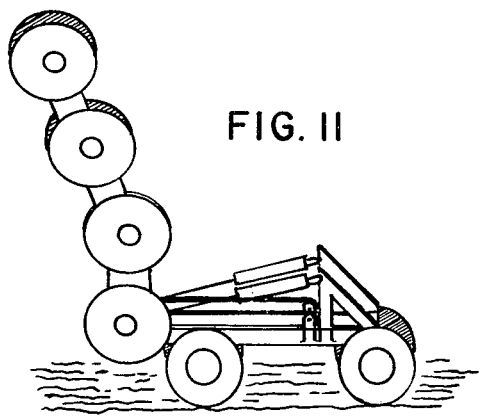
FIG. 11
FIG. 12
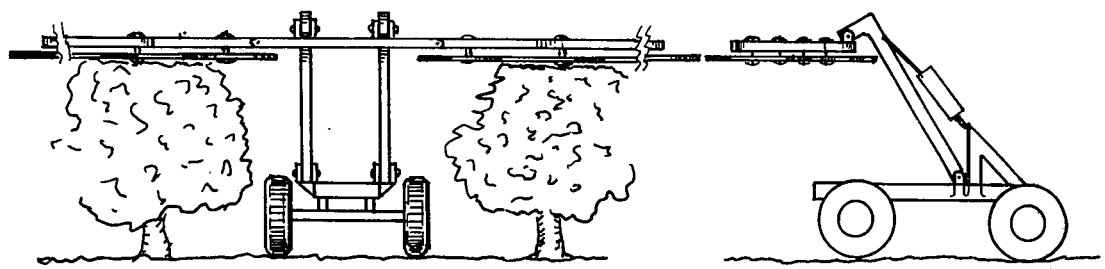
FIG. 13
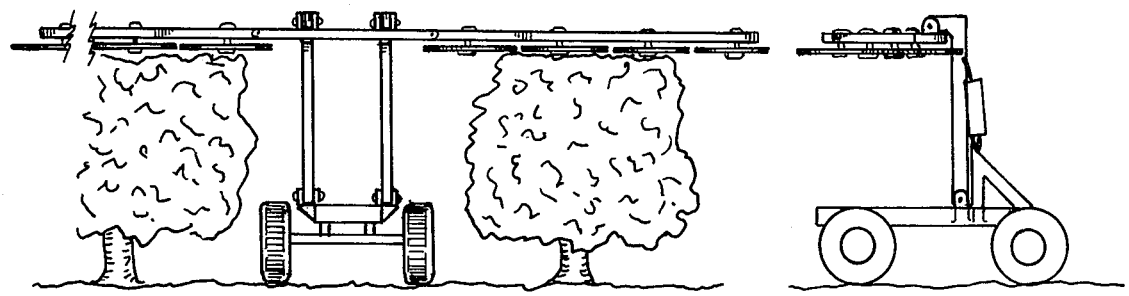

COMBINED HEDGER-TOPPER

BACKGROUND OF THE INVENTION

It has long been known that fruit bearing trees require pruning periodically in order that they will bear well. Although it is basically economical to utilize substantially all of one's acreage fully when planting trees, when a comparatively large number of trees have been planted they tend to grow together, and thus to some extent shutting out needed sunlight.

Hedging machines have been marketed for a number of years, with these machines having booms that extend substantially vertically, and upon which a plurality of large diameter, rapidly rotatable saw blades are disposed. These blades are located fairly close together, and when a machine carrying these saw booms is moved along between two essentially parallel rows of trees, the saw blades bring about a rapid cutting of the limbs extending out overly far from each tree. As a result, effective passageways are maintained between the trees, fruit grows well upon the resulting new growth, the better availability of sunlight results in better tree health and a better crop, and the fruit is much easier to harvest.

Some citrus trees grow rapidly on top, and take on what is sometimes referred to as wild growth. Therefore, there have also been on the market for a number of years, so-called topping machines, with such machines having saw carrying booms that extend generally horizontally at elevated locations essentially corresponding to the desired height for the trees of the groove or orchard. The machine passing along between two rows of trees makes it possible for rapidly rotating saw blades to achieve a topping action that not only minimizes such wild growth, but also it results in new growth that encourages the bearing of additional fruit. The saw blades of a topping machine are likewise power driven, and upon such vehicle being pulled along between the rows of trees of a groove or orchard, the trees contacted by the saw blades can be brought to a uniform height.

As is obvious when the size and complexity of these two types of machines are taken into consideration, they are necessarily quite expensive, and would be a major expenditure for a grove owner, especially when it is realized that the possession of one type of machine does not enable the function of the other type of machine to be carried out, with it therefore being necessary for the grove or orchard owner to buy or rent both types of machines in order for a complete tree trimming operation to be performed.

SUMMARY OF THIS INVENTION

In accordance with the present invention, a novel self-propelled apparatus is provided, with its design being such that it alone can perform the hedging as well as the topping of the trees of a grove or orchard. This device typically takes the form of a wheeled vehicle upon which is mounted a U-shaped member principally constituted by elongate arms joined by a base member. The arms at locations remote from the base member are pivotally connected to the vehicle, with power means such as actuators being provided in order that an operator can cause the arms to be brought from an essentially horizontal position, to selected elevated positions, including an essentially vertical position. Operably mounted upon the base member are a pair of power operated booms, with a multiplicity of power driven saw blades being disposed at spaced locations along each boom. As is obvious, upon these booms being placed at a desired attitude, the vehicle caused to move along between rows of trees, a desired tree-trimming operation can be carried out, which can of course be either a hedging or topping operation.

Movement of the U-shaped member from a position in which its arms are generally horizontally disposed, into a position in which its arms are generally vertically disposed, necessarily results in the booms supported by the base member being brought to a considerably elevated position with respect to the ground. While this change in elevation is desirable when high hedging or a topping operation is to be carried out, this 90° or more rotation of the arms would ordinarily cause 90° or more of rotation of the base member, which would necessarily place the booms in an attitude such that the saw blades carried by the booms could not be brought into the desired attitude for topping the trees contacted.

It is because of this inherent limitation that I provide, in accordance with this invention, an arrangement such that the base member of the U-shaped member may be selectively rotatable up to 90° with respect to the arms of the U-shaped member. A suitable power means is provided such that the operator can selectively bring about rotation of the base member in such a manner as to maintain the principal plane of this member in a generally horizontal attitude during all operating conditions. As a result, the booms, as well as the saw blades carried thereby, are always in the proper attitude for bringing about either a hedging operation, or a topping operation, depending on the operator's choice.

It is to be emphasized that my invention makes it possible for a single machine to carry out a wide range of tree trimming operations. For example, it is often desired to trim trees such that they have straight sides and flat tops. Such may be accomplished by first causing my self-powered machine to pass down between two rows of trees, with the saw booms disposed essentially vertically, with such position of the saw booms resulting in the saw blades shaping the trees such that they have straight sides. Thereafter, the U-shaped member of my device is moved from the position in which its arms are essentially horizontally disposed, into a position in which its arms are disposed at a steep angle. This, of course, results in the saw carrying booms being brought into a position above the ground consistent with the desired height for the trees. Either concomitant with the movement of the arms, or as a separate step, the base member is rotated so as to cause the saw booms and blades to be brought into an appropriate cutting relation with the trees, thus making it possible for the rapidly rotating blades to quickly bring the contacted trees to a common height.

As an alternative to the straight sides, it may be desired to have trees with somewhat sloping sides. This is, of course, accomplished by causing the saw carrying booms to be moved apart for a distance greater than the distance between the booms when they are in the normal vertically disposed positions. As is obvious, the trees may have sides that slope upwardly at a substantially continuous angle, or alternatively, the booms may later be elevated and placed at an even greater distance apart, thereby making it possible to trim the tops of the trees such that the tree tops have a somewhat pyramidal shape. Still another alternative is for the trees with sloping sides to have flat tops.

It is most significant to realize that by the practice of this invention, the long, unwieldy prior art type saw booms commonly used when tall trees are to be hedged, may be entirely eliminated and replaced by comparatively short saw booms, without losing the capability of being able to hedge and top such tall trees. This is because in accordance with this invention, the saw booms are mounted upon the rotatable base portion of the previously-described U-shaped member. The fact that the U-shaped member can be rotated about the vehicle body for ninety or more degrees makes it possible for the height of the saw carrying booms to be varied for a considerable extent. This of course means that the effective operational height of the saw booms may be such that the sides of even the tallest trees can have a hedging operation performed upon them, and it likewise means that even the tallest trees of an orchard or grove can be topped. These results are not available in prior art tree trimming machines inasmuch as no one has previously designed an arranged in which not only can the saw booms be raised a considerable extent very easily, but also, the orientation if the saw booms controlled such that the rapidly rotating saw blades can at all times engage the desired tree portions in a proper attitude.

It is, therefore, a primary object of my invention to provide a device usable in a grove or orchard for selectively accomplishing either a hedging operation or a topping operation.

It is another object of my invention to provide a self-propelled device, equipped with one or more saw-carrying booms, which booms can be operated either in an essentially vertical attitude such that a hedging operation in a grove or orchard can be accomplished, or in an elevated, essentially horizontal, and appropriately rotated attitude such that a topping operation can be carried out.

It is still another object of this invention to provide an extremely versatile mounting arrangement for saw-carrying booms, such that not only can the booms be operated in vertical or near vertical positions close to the ground, but also in raised vertical positions such that high hedging on tall trees can be carried out.

It is yet another object of this invention to provide a highly effective mounting arrangement for saw-carrying booms as to enable the booms to be operated in vertical or near vertical positions high above the ground, or in a substantially horizontal and appropriately rotated position at any selected altitude within the limits of the machine, thereby making it possible to not only hedge trees of a wide range of sizes, but also to top the trees, and thereby bring them to any desired height.

It is yet still another object of my invention to provide a simple and easily utilized apparatus such that a single operator may rapidly and selectively bring about a low hedging, a high hedging, or a topping operation utilizing a single vehicle equipped with comparatively short saw-carrying booms, and acting without assistance.

It is still another object of this invention to provide a tree-trimming machine equipped with comparatively short, saw-carrying booms, which booms can be affectively employed in a number of tree trimming positions, including substantially elevated positions when tall trees are to be hedged or topped, thus eliminating any requirement for a tree trimming machine to be equipped with long, unwieldy booms of the type formerly required in order that tall trees could be hedged.

It is still another object of this invention to provide a vehicle entirely powered and equipped with hydraulic motors and actuators, with selectively operable control means being provided such that the operator can selectively control virtually all phases of operation of the vehicle.

DESCRIPTION OF DRAWINGS

FIG. 11 is a view revealing how taper hedging could be carried out on uneven terrain, with one saw booms in such instance being inclined at a greater angle to the vertical than the other one, in order that the trees can each be tapered to a like amount;

FIG. 12 is a view showing the topping of trees of intermediate height, with the arms of the U-shaped member being disposed at a substantial angle to the horizontal;

FIG. 13 is a view showing the topping of tall trees, with the arms of the U-shaped member in this instance disposed in vertical positions so as to place the support for the saw booms at maximum height.

DETAILED DESCRIPTION

Figure 1:
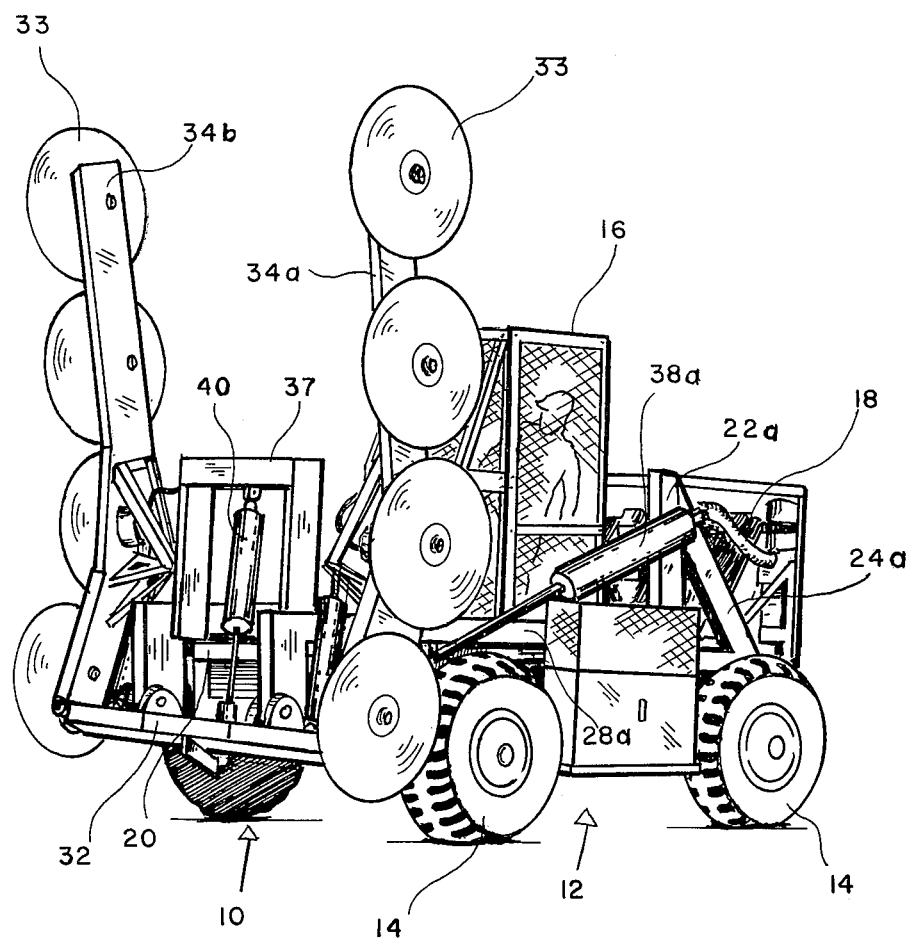
FIG. 1 is a perspective view of a highly versatile tree-trimming machine in accordance with this invention, with the saw-carrying booms of this self-propelled machine shown in substantially vertical position.

Turning first to FIG. 1, it will be seen that I have there illustrated a primary embodiment of my apparatus 10 for performing a hedging as well as a topping operation in a grove or orchard, comprising a vehicle 12 adapted for movement along the ground between aligned rows of trees. The vehicle may be equipped with wheels 14, or alternatively it may be equipped with tracks.

A cab portion 16 may be provided in an essentially centrally disposed portion of the vehicle, from which the operator manipulates control levers (not shown) associated with movements of the vehicle over the ground, and the carrying out of cutting and trimming operations described hereinafter. Located behind the cab is the engine 18, which is preferably a Diesel engine arranged to provide the power for driving hydraulic pumps (not shown) for supplying fluid under pressure to the various hydraulic actuators utilized in connection with the arms and booms of the device. As will be described at greater length hereinafter, I prefer an arrangement in which all actuators are hydraulic, and the motors for driving saw blades 33 as well as the wheels of the vehicle are hydraulic, with the previously mentioned control levers being associated with control valves, such that the operator can selectively control the flow of hydraulic fluid to the actuators and motors.

Figure 2:
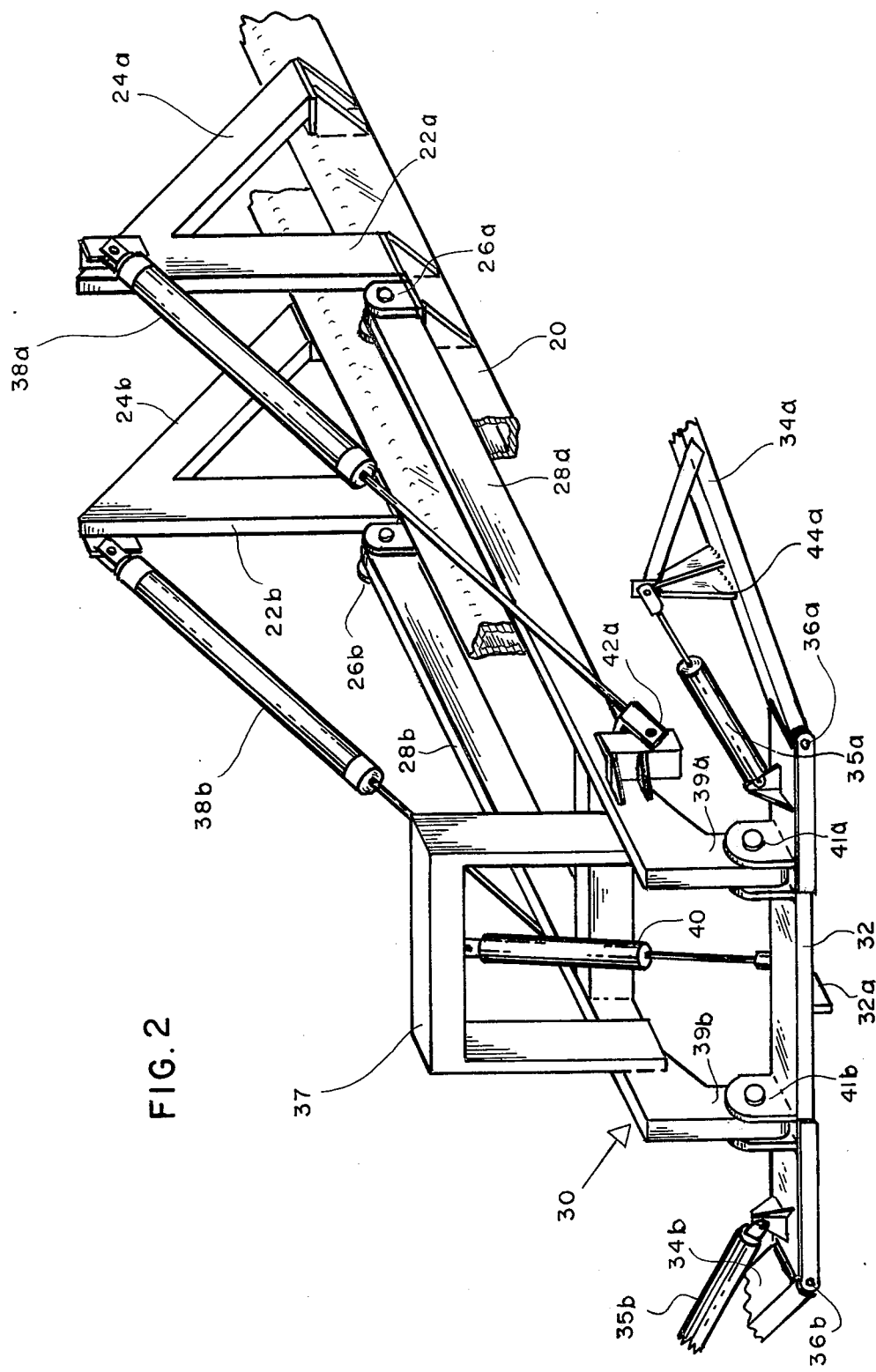
FIG. 2 is a perspective view to a somewhat larger scale, and with substantial portions of the machine removed in order that certain frame details, including my novel U-shaped member and its rotatable base member, can be seen clearly.
Figure 3:
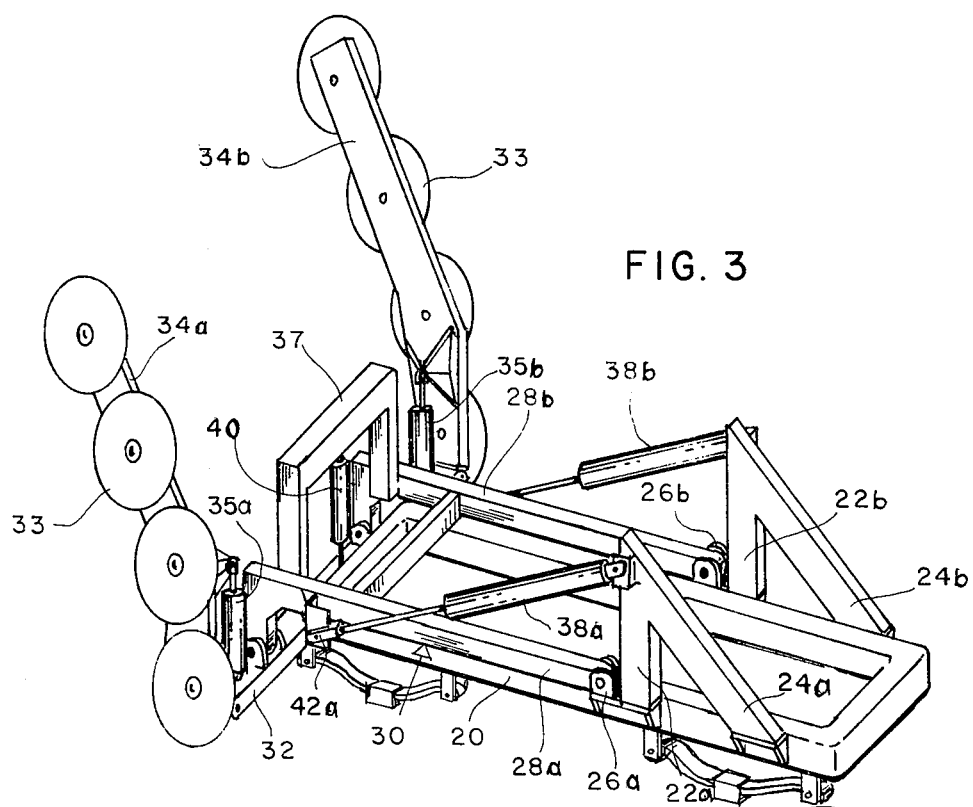
FIG. 3 is a perspective view of the frame portion of my machine from a somewhat different angle that seen in FIG. 2, and with the saw booms shown in place on the novel base member.
Figure 4:
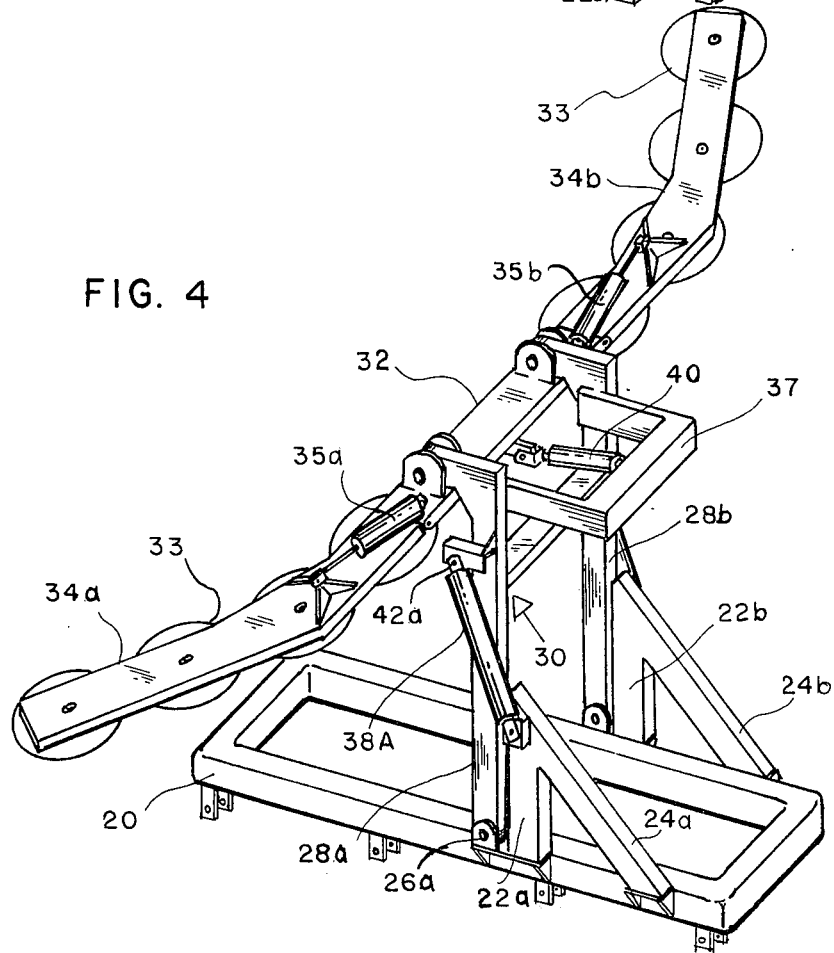
FIG. 4 is a perspective view with the frame of my machine in the same position as in FIG. 3, but with the U-shaped member raised to a substantially vertical position in order that the horizontally-extending saw booms could be used to perform a topping action on comparatively tall trees of an orchard or grove.

Frame 20, partially visible in FIG. 1, and visible in considerable detail in FIGS. 2 through 4, is supported by the wheel axles by the use of suitable springs (not shown) and extends for a substantial portion of the length of the vehicle. Extending upwardly from a location near the rear end of the frame 20 are actuator support members 22a and 22b, with these members being reinforced by brace members 24a and 24b, respectively. Supported from pivot locations 26a and 26b just forward of the vertically-extending actuator support members, are the arms 28a and 28b of U-shaped structural member 30. It is the structural member 30 with its unique rotatable base portion 32, that forms the highly versatile support for the elongate booms 34a and 34b, upon which the saw blades 33 are mounted.

Because the U-shaped member 30 is able to be moved for a considerable extent about its attachment points 26a and 26b, saw-carrying booms 34a and 34b supported by the base portion 32 can move between an operational position primarily concerned with low hedging, and an operational position from which both high hedging as well as topping can be accomplished. Selective movements of the U-shaped member under the control of the operator are effected by the use of large hydraulic actuators 38a and 38b located on the sides of the vehicle, being supported from the upper ends of the actuator support members 22a and 22b, respectively, by the use of suitable clevis members. The rod portions of these actuators are arranged to attach at forward locations 42a and 42b on the U-shaped member 30. As is clear from FIGS. 2 and 3, when the actuators 38a and 38b are in their extended positions, the arms of the U-shaped member are generally horizontally disposed, whereas when hydraulic fluid is ported so as to cause the actuators to decrease in length, the arms of the U-shaped member are caused to raise to a position selected by the operator, and they may ultimately reach a vertical position; note FIG. 4. I typically use hydraulic actuators of 4 inch diameter, having four foot strokes for effecting movements of the U-shaped member 30. Structural brace 37 of substantially U-shaped construction is responsible for keeping the arms 28a and 28b in parallel relation to each other at all times.

Figure 7:
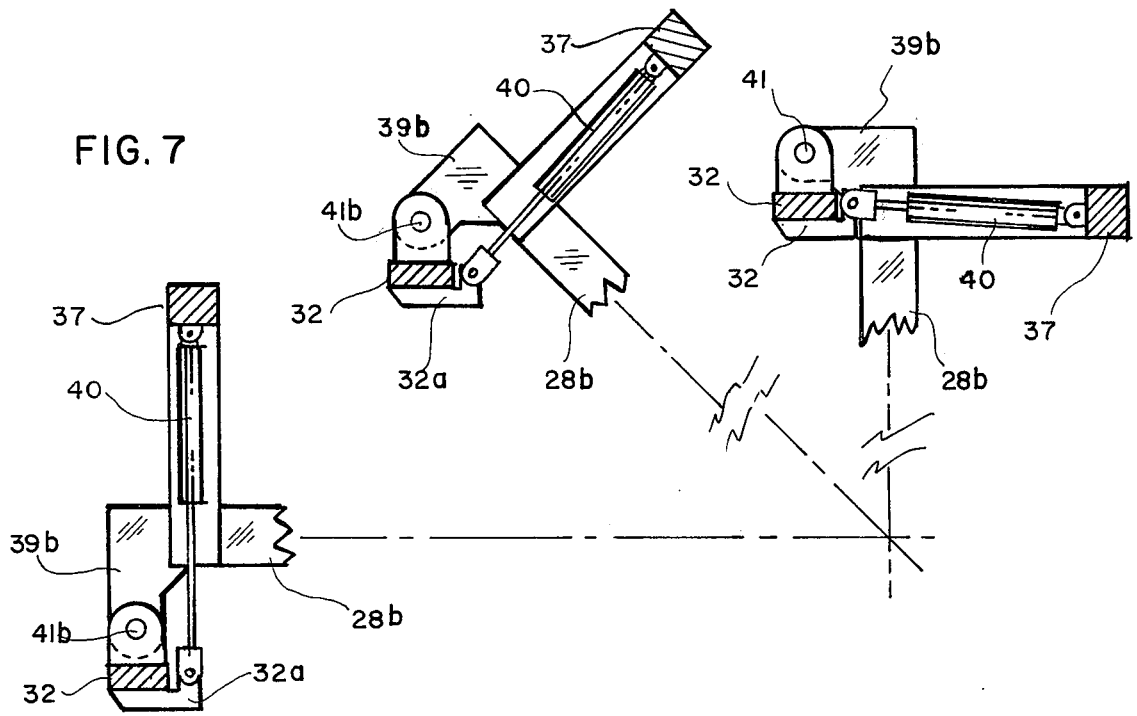
FIG. 7 is a type of fragmentary view, showing the arms of the U-shaped member in successively different positions, and the corresponding rotation of the base member that must take place in order for the saw booms to be supported in positions that at all times are functional.

Referring primarily to FIG. 2 it is to be noted that the arms of the U-shaped member in the vicinity of the base portion 32 are bent approximately 90° to form downwardly directed portions 39a and 39b. The lower ends of portions 39a and 39b are shaped to be pinned in clevis members 41a and 41b located on the top of the base portion 32, and as a result of this arrangement, the base portion can be moved rotationally for a substantial number of degrees about the downwardly directed members 39a and 39b, in the manner shown in FIG. 7. As is apparent from the first several figures, I provide an actuator 40 that is supported from the underside of the brace 37, with the rod portion of this actuator being connected to a member 32a extending for a short distance rearwardly from the mid portion of the member 32. When the actuator 40 is in its extended condition, the principal plane of the base portion 32 is essentially parallel to the arms 28a and 28b, as shown in the lower part of FIG. 7, whereas when this actuator is caused to decrease in length, the principal plane of the base portion 32 is caused to assume angular relationship to the arms 28a and 28b, as shown in the middle and upper portions of FIG. 7. This arrangement is of importance in enabling the saw-carrying boom members to move between the positions effective for the hedging and for the topping operations, as will be explained in detail shortly. The actuator 40 can be of 4 inch diameter, and have a 20 inch stroke.

The boom members 34a and 34b are, in the embodiment of my invention herein illustrated, carried by the outer ends of the base portion 32, with the lower ends of the booms being secured in hinged relation to the base portion by the use of pins 36a and 36b in the manner best shown in FIG. 2. As a result of an actuator 35a extending between a suitable clevis member on the base portion 32 and a support 44a on the boom 34a, and an actuator 35b extending between similar mounting means on the other end of the base portion 32, and on the boom 34b, the saw booms can be selectively caused to pivot about the hingle joint formed by the pins 36a and 36b. In this way, the booms can be caused to assume any of a wide variety of positions in which their large diameter saw blades 33 are disposed so that they can be utilized for cutting and trimming trees, bushes, and the like. Typically, the booms are in essentially vertical positions when hedging, and essentially horizontal when topping.

In FIG. 3, the saw booms 34a and 34b are shown in essentially vertical positions, so that they can accomplish a hedging operation as the vehicle is driven along between two rows of trees. The saw blades are closely spaced, with only an inch or so clearance between their adjacent edges. However, in order to prevent comparatively small branches passing uncut between an adjacent pair of blades, I preferably construct the saw booms so as to have a slight "dog leg" configuration, with the three upper saw blades being disposed in successively more forward positions. Because the axes of rotation of the blades are disposed along a somewhat forwardly inclined line, which may be example be 150° away from the vertical, the blade tips are in effect disposed in an overlapping relationship when considered along an arbitrary vertical line passing through the blades, and this fact makes it quite remote that an encountered branch can pass in uncut condition between the rapidly rotating blades.

Figure 5:
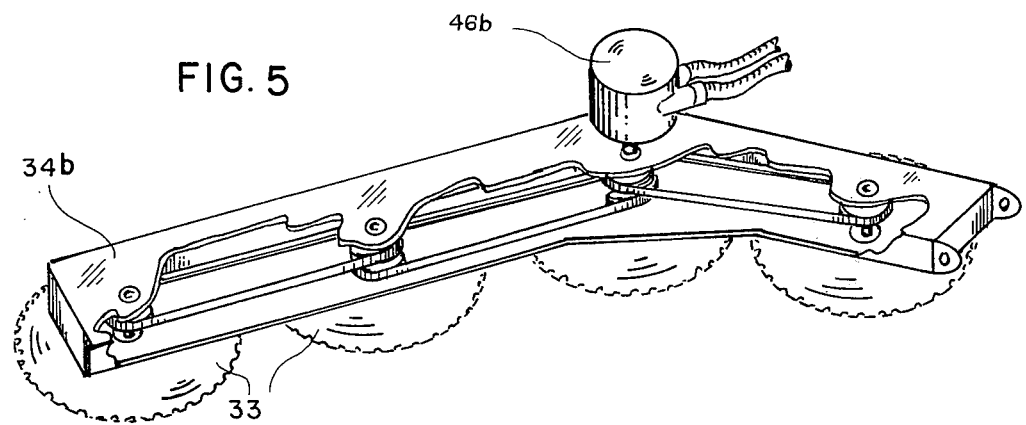
FIG. 5 is a fragmentary perspective view of a saw boom, with portions removed in order to reveal how a single hydraulic motor could be used for driving a number of large diameter saw blades in rotation.

As revealed in FIG. 5, each boom may be of essentially hollow construction, involving the use of aluminum plates, for example, that have been welded together to form booms of the desired length. Although I could use a multiplicity of motors in each boom for driving the blades, I prefer an arrangement as shown in FIG. 5, in which a single hydraulic motor 46b is mounted on boom 34b, on the side away from the blades. Motor 46b is arranged to drive a shaft upon which a single blade, but double sheaving is utilized. A driving belt, such as a V-belt, passes around each of such sheaves, with such belts extending in opposite directions in order to transmit power to the sheaves of the adjacent blades. The shaft associated with one of such adjacent blades also utilizes double sheaves, and this of course makes it a simple matter to accomplish the re-transmission of power to the next more distant blade, using of course an additional belt. The motor 46b is connected to a hydraulic supply system, as will be discussed in detail hereinafter.

FIG. 4 reveals the fact that in accordance with my invention, the booms 34a and 34b can be caused to extend laterally at a suitable treetop height, and thus be in a position for accomplishing a topping operation in which the trees are brought to a uniform height. Quite obviously, the booms are brought to this considerable height by operation of the U-shaped structural member 30, which is caused by action of hydraulic actuators 38a and 38b to pivot about its attachment point 26a and 26b. In other words, as the operator brings about a porting of hydraulic fluid such that the large actuators 38a and 38b are caused to decrease in length, this causes the arms 28a and 28b to pivot about their respective attachment points 26a and 26b, such that they rise together to a desired angle with the frame 20, which may or may not be a vertical position. Obviously, lesser heights than the maximum height can be obtained by causing the U-shaped member to rise to a desired intermediate location, from which the booms 34a and 34b are deployed.

Figure 6:
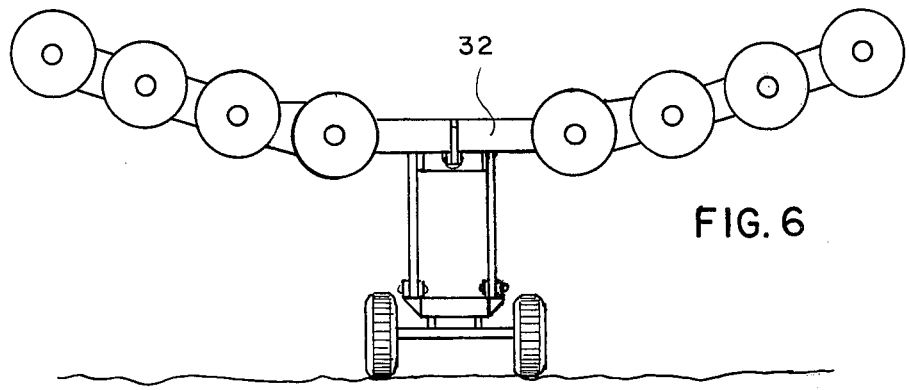
FIG. 6 is a view revealing the non-functional saw blade attitude that would result if the booms were moved downwardly from the position shown in FIG. 3, and the arms of the U-shaped member were then raised in order to position the saw booms in elevated positions.

It is most important to note the function served by the base member 32 of the U-shaped member 30 being pivotally movable about the ends 39a and 39b of the arms 28a and 28b. The occasion for this arrangement can be appreciated more fully as a result of visualizing the successive movements of the booms 34a and 34b from an essentially vertical position as shown in FIG. 3, to an essentially horizontal position, as shown in FIG. 4. If the operator sets out to perform a topping operation merely by extending the saw booms laterally and then causing the actuators 38a and 38b to decrease in length so as to cause the arms 28a and 28b to rise, this would not result in the saw blades being brought to the positions shown in FIG. 4, but rather would bring about a condition exemplified by FIG. 6, wherein the principal planes of the blades 33 are essentially vertically disposed. Quite obviously, when in this attitude, the saw blades could not perform a topping operation. Therefore, it is desirable to be able to bring about a rotation of the booms 34a and 34b about their longitudinal axes in order to cause the saw blades to be disposed on the underside of the booms, with the plane of the blades being essentially horizontal, as was shown in FIG. 4. This of course is able to be accomplished easily in accordance with this invention by the operator causing the base member 32 to rotate from the position shown in the lower portion of FIG. 7, wherein the principal dimension is parallel to the arm 28a (and 28b), to the position wherein the principal dimension of the member 32 is perpendicular to the arm 28a, as shown in the upper portion of FIG. 7. As should be apparent, when the arms 28a and 28b are vertically disposed, if the member 32 is perpendicular to the arms, this will cause the booms to be positioned in the correct angular relationship to the ground as to enable the saw blades 33, when the booms are extended essentially horizontally, to be able to carry out an effective topping operation. Hedging at less than the maximum height is accomplished with the arms 28a and 28b at an angle such as shown in the mid-portion of FIG. 7, with the base member disposed in the appropriate, essentially horizontal position.

Figure 8:
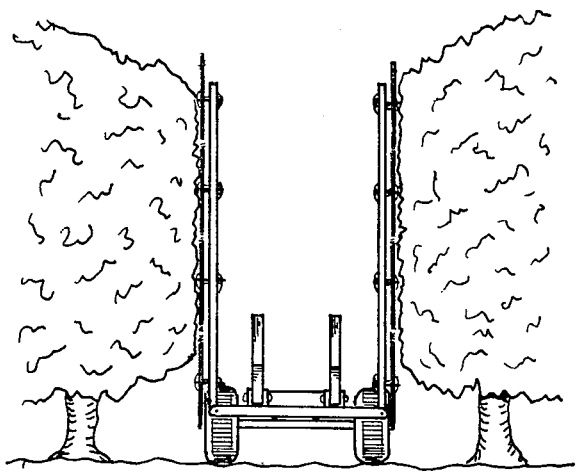
FIG. 8 is the first of a series of schematic views, with the saw booms in this view being generally vertical, and in a position appropriate for bringing about a low hedging operation, this latter being true as a result of the arms of the U-shaped member being essentially horizontal.
Figure 8:
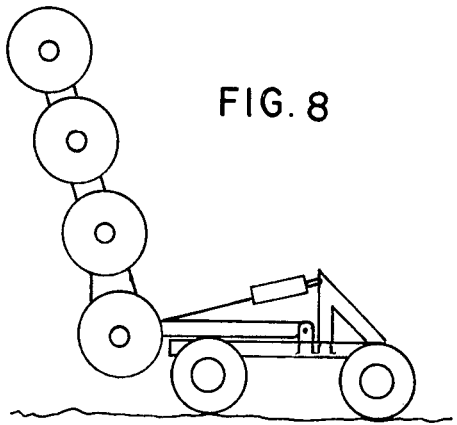

Reference to FIG. 8 reveals the manner in which low hedging can be accomplished in accordance with this invention. As revealed on the left hand side of this figure, the saw booms are essentially vertical and parallel with each other, and the right hand side of this figure reveals the fact that the U-shaped member is in a horizontal position, which of course means that the saw booms are in their lowest position, insofar as hedging is concerned. Base member 32 is obviously horizontally disposed in this instance, with its relationship to the arms 28a and 28b being the same as in the lowermost portion of FIG. 7.

Figure 9:
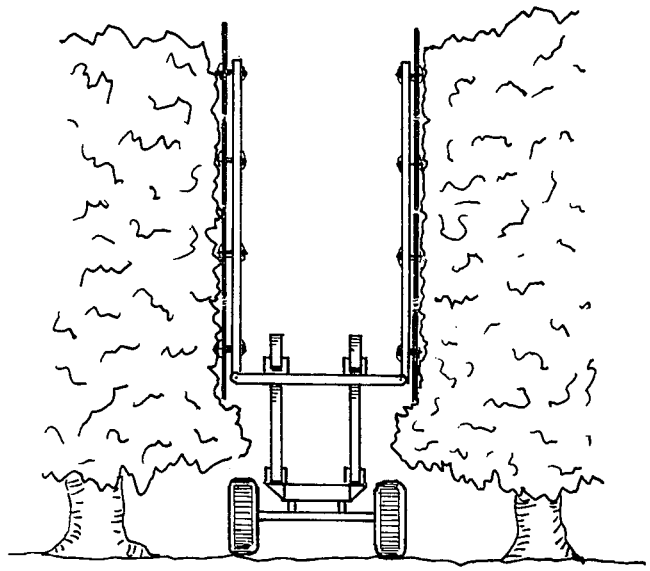
FIG. 9 is a view showing the saw booms in a position for high hedging, with the arms of the U-shaped member being shown inclined at a substantial angle.
Figure 9:
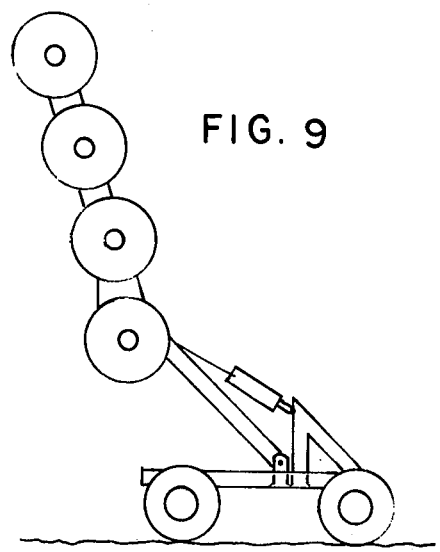

The next figure, which is FIG. 9, reveals on the left hand side a high hedging operation, in which trees of considerable height are being trimmed. This is made possible in accordance with this invention, as revealed on the right hand side of this figure, by the U-shaped member being raised to a comparatively steep angle, which obviously raises the saw booms with respect to the ground. As is also obvious, the base member 32 is horizontal, or substantially horizontal, at this time, which means that its relationship to the arms 28a and 28b is approximately the same as shown in the mid-portion of FIG. 7.

Figure 10:
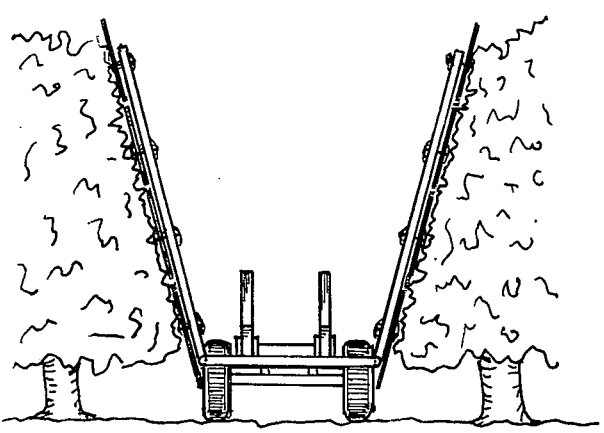
FIG. 10 is a view revealing how taper hedging may be carried out, with the saw booms spread apart for a preferred extent.
Figure 10:
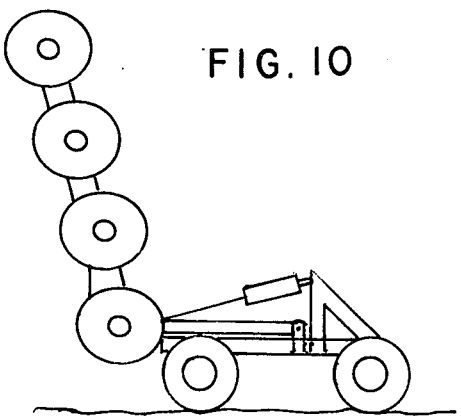

Reference to FIG. 10 reveals that the saw booms are not necessarily in vertical positions when the hedging operation is to be brought about. Rather, as revealed in this figure, the saw booms may be moved apart so that a taper hedging operation can be carried out.

FIG. 11 reveals that there is no requirement that the saw booms maintain equal angles with the base member 32, for when hedging on uneven terrain, for example, one of the saw booms can be disposed at a decidedly different angle with respect to the base member than the other boom, so that a like taper may be performed upon each of the trees encountered.

Of incidental interest is the fact that typically, when performing a hedging operation, the operator does not pass down every row of the grove or orchard, but rather he passes down every other row. In this way, any substantial shock to a tree is minimized, for hedging of the other side of each tree can be carried out at another time, after it has adjusted to the removal of the branches on the one side.

Referring now to FIG. 12, it is to be seen that topping can be carried out at an almost infinite number of heights within the scope of operation of my machine. If comparatively small trees are being topped, the U-shaped member is brought to an angle with the horizontal, as depicted in the figure, with the base member 32 being caused to be disposed in substantially a horizontal position, as was noted in the mid portion of FIG. 7. The saw booms are likewise placed in a horizontal position, and as a result, the circular saw blades are in a position to bring about a rapid and effective topping operation with respect to the trees encountered. Desirable changes in height are of course possible on a moment-by-moment basis in accordance with this invention merely by the operator changing the angularity of the U-shaped member, and of course making commensurate changes in the angularity of the base member 32.

With regard to FIG. 13, it is to be seen that maximum height topping is achieved with the U-shaped member brought to the vertical position by appropriate motion of the actuators 38a and 38b. The base member 32 is of course still utilized in the horizontal position, as shown in the far right portion of FIG. 7. Utilization of the topping machine in this manner results in the elimination of wild growth, and the improvement in the health of the trees.

It is to be noted that although the saw blades are generally regarded as being directed straight ahead when hedging, for example, I prefer to cant the saw blades slightly, such that the edge that is forwardmost at any given moment extends slightly outwardly with respect to the rearmost edge of the blade. In this way, the blades cut most effectively, and drag on the branches is minimized.

Figure 14:
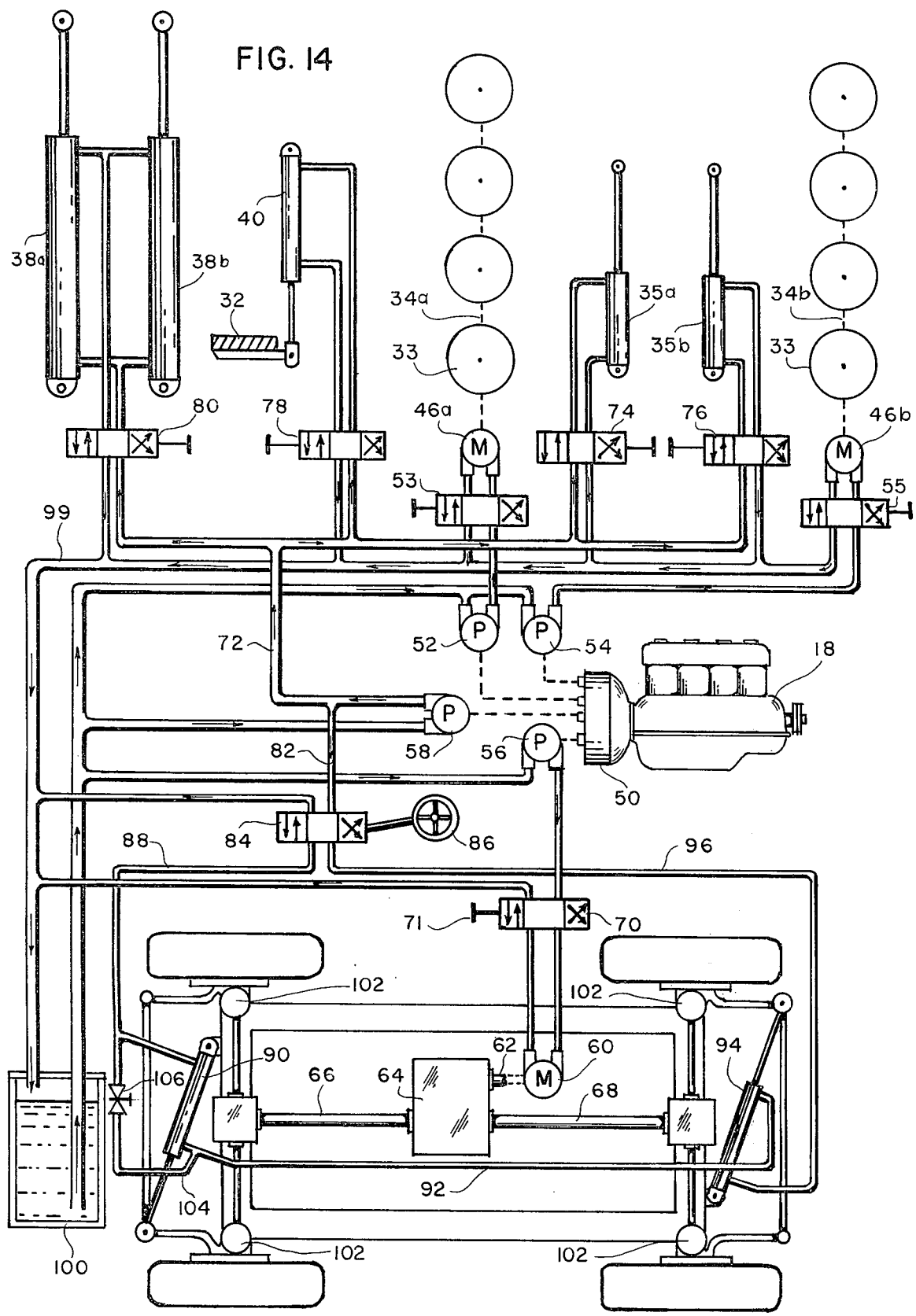
FIG. 14 is a schematic of a preferred arrangement of a hydraulic control system wherein hydraulic motors and hydraulic actuators are utilized for bringing about the operation of the various components of my novel machine.

FIG. 14 reveals a preferred arrangement for supplying power for the operation of my device, which is a hydraulic system in which hydraulic fluid under pressure is delivered to the various motors and actuators of my hedging and topping machine. The prime power is supplied by engine 18, which for example may be a 41-71 GMC diesel engine. In accordance with this preferred embodiment, the engine is utilized with a pump drive case 50, such as made by Safeguard Automotive Corporation of Kendallville, Indiana. Such a drive case has provision for mounting a plurality of hydraulic pumps, such as the pumps 52, 54, 56 and 58 as viewed in FIG. 14. These pumps are driven at a proper rotative speed by the engine, such they they will provide a sufficient flow of hydraulic fluid at the peoper pressure, for meeting all the hydraulic needs of the vehicle, including propulsion, operation of the saw blades, and operation of the numerous actuators.

A considerable amount of power is involved in driving the saw blades 33 in rotation, so I prefer to direct the entire output of pump 52 for use by the saw drive motor 46a, which is responsible for driving the blades on saw boom 34a. Control valve 53, located in the cab 16 and under the control of the operator, is provided in order that the saw blades may be selectively. Similarly, the entire output of pump 54 is directed for use by the saw drive motor 46b, which, as previously explained, is utilized for driving the blades on saw boom 34b. Control valve 55 enables the operator to operate the blades of drive motor 46b from the cab. The arrangement I prefer involves the blades being driven at a single operative speed, which typically is 1600 rpm when the pumps are supplying hydraulic fluid at 2000 psi, although a variable speed arrangement for the saw blades could be substituted if desired.

Pump 56, likewise driven from the engine 18, is utilized for supplying hydraulic fluid under pressure to hydraulic motor 60, utilized for driving the vehicle wheel 14 in rotation. The shaft output of motor 60 is connected via shaft 62 to transfer case 64, which in turn has output shafts 66 and 68, with shaft 66 being utilized for providing driving rotation to the front wheels, and shaft 68 being utilized for powering the rear wheels. The speed of travel of the vehicle over the ground is determined by the selective adjustment of the lever 71 associated with control valve 70, which also is located in the cab, and under control of the operator. The arrangement makes the vehicle highly maneuverable, and for example the operator can quickly cause the vehicle to go from forward travel into reverse merely by an appropriate manipulation of the lever 71. Because of this arrangement, it is not mandatory that I equip the vehicle with conventional brakes, although I typically do utilize a brake system.

The output flow from pump 58 divides, with branch 72 being connected to provide fluid flow via suitable control valves 74 and 76 to the actuators 35a and 35b utilized for controlling the attitude of the saw booms 34a and 34b with respect to the ground; via control valve 78 utilized for controlling the angularity of base member 32; and via control valve 80 utilized for enabling the operator to select on a moment-by-moment basis, the angularity of the arms of the U-shaped member 30. Branch 82 is, on the other hand, connected to provide fluid flow from pump 58 to the actuators 90 and 94 concerned with steering the vehicle 12. The flow through branch 82 is via control valve 84, which is manipulated by steering wheel 86. The arrangement is such that turning the wheel 86 to the left (or counterclockwise) causes the flow of hydraulic fluid in fluid line 88, which causes extension or elongation of actuator 90, such that the front wheels turn to the left, turning about knuckle joints 102 in doing so. A hydraulic line referred to as cross connection 92 may be provided to interconnect front actuator 90 with rear steering actuator 94, so that the flow of fluid also causes a decrease in length of actuator 94, which in turn causes the rear wheels to seemingly turn to the right. However, this is the appropriate steering direction, for the front wheels being steered to the left while the rear wheels are steered to the right makes possible the turning of the vehicle 12 to the left on a small turning radius.

As will be easily understood, by the operator turning the steering wheel 86 clockwise, the motion of the actuators 90 and 94 is reversed, for hydraulic fluid is ported along hydraulic line 96 to the rear actuator 94, causing the rear wheels to turn to the left, thence along cross connection 92 to the front actuator, causing it to turn the front wheels to the right, such that the vehicle executes a small radius turn to the right. In such manner as this I have been able to provide a vehicle having a ten foot turning radius, enabling it to turn between rows of trees planted on twenty foot centers. I prefer to use an orbitral steering assembly in the front and the rear of the vehicle, but I am not to be so limited.

As in the case of all hydraulic arrangements of this general type, the fluid is continuously circulated, with the fluid leaving each of the motors being delivered by a return line 99 to a hydraulic reservoir 100. It is from this reservoir that the pumps draw their fluid.

An inherent difficulty may result from the use of the preferred arrangement in which both the front and the rear wheels are steerable, for from time to time a form of assymetry may develop in the steering arrangement, such that when the front wheels are directed straight ahead, the rear wheels may steer slightly to the right or the left. As a result, it is desirable to utilize an arrangement by means of which the operator can assure that the rear wheels properly "track" behind the front wheels. A by-pass 104 allows the flow of hydraulic fluid to circumvent the front steering actuator on occasion, with the flow through the by-pass being controlled by a valve 106.

In use, the driver would rotate the steering wheel until the front wheels are straight, and then he would open valve 106. This would allow the flow of fluid, as before, to travel to the rear steering cylinder, and cause a steering action of the rear wheels as the steering wheel is rotated. When he has thus moved the rear wheels into straight-ahead positions, he closes valve 106, which of course restores the steering arrangement to one in which the front wheels and the rear wheels are in true alignment for forward travel. The by-pass could of course be utilized on either the front or the rear steering unit.

As an example of some of the components I may use on my all hydraulic vehicle, I prefer to use a Dynapower controlled hydraulic transmission manufactured by Hydreco of Kalamazoo, Michigan, and in particular, I may use Model 30 pumps and Model 120 motors.

As to the pumps and motors associated with the saws, I prefer to use 18PL pumps and 2020H motors, also made by Hydreco.

The large actuators 38a and 38b, as previously mentioned, typically have a 4 inch bore and a 4 foot stroke. I preferably obtain these actuators from Cross, and in order to assure that equal amounts of fluid are ported to these actuators, I preferably use a Delta PM-6 divider in the fluid lines.

To prevent dropping of the operated component if a hose or fitting should fail, or if hydraulic pressure should be lost, I utilize pilot pressure operated check valves in the lines to the large actuators 38a and 38b, as well as in the lines to the boom actuators 35a and 35b, and to the actuator 40.

The latter three actuators may each have a four inch bore and a twenty inch stroke, and for example may be Model H-B5-2-20 actuators manufactured by Lynair of Jackson, Michigan.

As is obvious, the foregoing identification of steering, transmission, pumps, motors and actuators is by way of example, and I am by no means to be limited thereto.

As should now be apparent, I prefer the use of an all-hydraulic arrangement for the control and operation of my novel vehicle for reasons of selectivity of control, dependability, and expense, but it obviously is within the spirit of my invention to use other power means, such as electric screw jacks or pneumatic actuators in place of the hydraulic actuators described herein. Also, the wheels of the vehicle could be connected by conventional mechanical components to the engine 18, and the saw blades could be driven from the engine by belt means. However, an all hydraulic arrangement of the type described and illustrated herein, and containing appropriate connections, fittings, relief valves, and the like are greatly preferred.

I claim:

1. An apparatus for maintaining a grove or orchard in properly trimmed and topped condition, comprising a vehicle adapted for movement along the ground in a direction essentially parallel and adjacent to a row of trees, a base member capable of substantial heightwise adjustments mounted on said vehicle, power means under the control of an operator for bringing about selected heightwise movements of said base member, a pair of elongate booms rotatably mounted upon said base member, with each boom operatively serving as a mounting for a plurality of spaced, power driven saw blades, and means for maintaining said base member in a proper rotational orientation with respect to the ground at all times, such that said saw booms are easily positionable to effect either a hedging operation or a topping operation.

2. The apparatus as defined in claim 1 wherein said base member is the base portion of a U-shaped member whose arms, at locations remote to said base member, are pivotally mounted upon said vehicle, for selective rotation thereabout.

3. The apparatus as defined in claim 2 wherein said power means under the control of an operator are hydraulic actuators arranged to move the arms of said U-shaped arms about their pivotal mountings for selected amounts, thus to selectively control the height above ground of said base member.

4. The apparatus as defined in claim 2 in which said means for maintaining said base member in a proper rotational orientation with respect to the ground is a hydraulic actuator mounted on said U-shaped member.

5. The apparatus as defined in claim 4 wherein all of said power means are controlled by control levers mounted in a cab of said vehicle.

6. The apparatus as defined in claim 2 in which said vehicle is equipped with hydraulic motors for driving said saw blades in rotation, as well as hydraulic motors for powering the vehicle over the ground at selected speeds, said vehicle also being equipped with hydraulic actuators for bringing about the selected pivotal movements of the arms of said U-shaped member, said vehicle further being equipped with an engine connected for driving one or more hydraulic pumps in rotation, thus to provide hydraulic fluid under pressure to said motors and said actuators, and selectively operable hydraulic control means disposed at locations easily available to the operator, such that the operation of said motors and actuators can be easily controlled.

7. The apparatus as defined in claim 6 in which the control means enabling the operator to control the speed of the vehicle over ground is a lever selectively movable in directions corresponding to either forward travel or reverse travel, thus making changes of travel direction as well as of speed a simple matter to bring about.

8. The apparatus as defined in claim 6 wherein both the front wheels as well as the rear wheels of the vehicle are steerable, with respective hydraulic actuators being utilized in connection with such wheels for the steering thereof, at least one hydraulic line interconnecting the hydraulic actuators associated with the steering of said front and rear wheels, such that when one pair of wheels steer in one direction, hydraulic fluid is caused to flow through said line to cause the other set of wheels to seemingly steer in the opposite direction, thus making it possible for the vehicle to turn about a small radius.

9. An apparatus for maintaining a grove or orchard in properly trimmed and topped condition, comprising a vehicle adapted for movement along the ground in a direction essentially parallel and adjacent to a row of trees, a generally U-shaped structural member operably mounted upon said vehicle, with said U-shaped member comprising a pair of arms, one arm on each side of said vehicle, and a base portion serving to interconnect said arms, the end of each arm remote from said base portion being rotatably mounted to an attachment point disposed on the side of said vehicle, power means for bringing about selective movement of said arms about their attachment points, thus to change the height of said base portion with respect to the ground, said base portion being mounted so as to be selectively rotatable with respect to said arms and the ground, a pair of elongate booms rotatably mounted upon said base portion, with each boom carrying a plurality of power driven saw blades thereon, and means for bringing about rotative movement of said base portion with respect to said arms, latter means making it possible to selectively change the relationship of said saw booms to said arms and ground, such that said saw booms can be easily placed in positions effective for accomplishing either a hedging operation or a topping operation.

10. The apparatus as defined in claim 9 in which said vehicle is equipped with hydraulic motors for driving said saw blades in rotation, as well as hydraulic motors for powering the vehicle over the ground at selected speeds, said vehicle also being equipped with hydraulic actuators for bringing about the selected pivotal movements of the arms of said U-shaped member, said vehicle further being equipped with an engine connected for driving one or more hydraulic pumps in rotation, thus to provide hydraulic fluid under pressure to said motors and said actuators, and selectively operable hydraulic control means disposed at locations easily available to the operator, such that the operation of said motors and actuators can be easily and carefully controlled.

11. The apparatus as defined in claim 10 in which the control means enabling the operator to control the speed of the vehicle over ground is a lever selectively movable in directions corresponding to either forward travel or reverse travel, thus making changes of travel direction as well as of speed a simple matter to bring about.

12. The apparatus as defined in claim 10 wherein both the front wheels as well as the rear wheels of the vehicle are steerable, with respective hydraulic actuators being utilized in connection with such wheels for the steering thereof, at least one hydraulic line interconnecting the hydraulic actuators associated with the steering of said front and rear wheels, such that when one pair of wheels steer one direction, hydraulic fluid flows through said line to cause the other set of wheels to seemingly steer in the opposite direction, thus making it possible for the vehicle to turn about a small radius.

13. A steerable vehicle utilizing an all hydraulic control system, such vehicle being adapted for movement along the ground in either a forward or reverse direction, said vehicle comprising a frame having one pair of steerable wheels forward, and another pair of steerable wheels at the rear, a base member movably mounted upon said vehicle, power means for bringing about heightwise movements as well as rotational movements of said base member, a pair of booms movably mounted upon said base member, with each of said booms having a plurality of power driven saw blades thereon, adapted for either hedging or topping a grove or orchard, and control means disposed at a location easily accessible to the operator of the vehicle, said control means including means for selectively controlling the power means utilized to move said base member heightwise as well as rotationally, and also including means for determining the direction as well as the speed of movement of the vehicle over the ground, and steering means enabling the front pair of wheels as well as the rear pair of wheels to be simultaneously steered, such that when the front wheels are steered in one direction, the other pair of wheels are steered in the other direction, thereby enabling the vehicle to execute small radius turns.

14. The steerable vehicle as defined in claim 13 in which said control means further include means for causing said power means to place said booms in essentially parallel relation for hedging, as well as in extended positions in which they are in essentially a straight line relationship to enable topping operations to be carried out.

* * * * *